United States Patent [19]

Ahmed et al.

[11] Patent Number: 5,829,527

[45] Date of Patent: Nov. 3, 1998

[54] COMPOSITIONS AND APPLICATIONS THEREOF OF WATER-SOLUBLE COPOLYMERS COMPRISING AN AMPHOLYTIC IMIDAZOLIUM INNER SALT

[75] Inventors: Iqbal Ahmed, Bartlesville, Okla.; Henry L. Hsieh, Pittsboro, N.C.; Ahmad Moradi-Araghi, Bartlesville, Okla.

[73] Assignee: Phillips Petroleum Company, Bartlesville, Okla.

[21] Appl. No.: 103,644

[22] Filed: Aug. 9, 1993

Related U.S. Application Data

[62] Division of Ser. No. 873,135, Apr. 24, 1992, Pat. No. 5,270,382.

[51] Int. Cl.$^6$ ........................ E21B 33/13
[52] U.S. Cl. ........................ 166/295; 166/300
[58] Field of Search ........................ 166/295

[56] References Cited

U.S. PATENT DOCUMENTS

| | | | |
|---|---|---|---|
| 3,050,390 | 8/1962 | Levinos et al. | |
| 3,478,001 | 11/1969 | Szita et al. | |
| 4,251,651 | 2/1981 | Kawakami et al. | 526/204 |
| 4,440,228 | 4/1984 | Swanson | 166/274 |
| 4,460,732 | 7/1984 | Buscall et al. | 524/460 |
| 4,471,097 | 9/1984 | Uhl et al. | 526/240 |
| 4,931,489 | 6/1990 | Kucera et al. | 523/130 |
| 5,203,834 | 4/1993 | Hutchins | 166/270 |
| 5,259,453 | 11/1993 | Johnston | 166/295 |

FOREIGN PATENT DOCUMENTS 976547  11/1964  United Kingdom.

OTHER PUBLICATIONS

Polymer, vol. 19, pp. 1157–1162 (Salamone et al, Oct. 1978).
J. Appl. Poly. Sci., vol. 22, pp. 1343–1357 (Taylor et al, 1978).
Chem. Abstr. 77:165125, synthesis and polymerization of vinylimidazole salts.

*Primary Examiner*—Christopher Henderson
*Attorney, Agent, or Firm*—Lucas K. Shay

[57] ABSTRACT

Polymer compositions and their applications in hostile environments for oil field operations are disclosed. The compositions contains a polymer which is copolymerized by (a) an ampholytic monomer having the formula of:

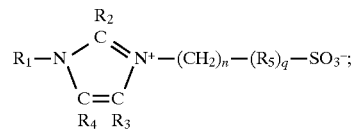

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer having an ethylenic linkage. The compositions further contain crosslinking agents, such as phenol and formaldehyde, for reducing permeability in a high temperature subterranean formation; and water for use in well treating fluids.

27 Claims, No Drawings

COMPOSITIONS AND APPLICATIONS THEREOF OF WATER-SOLUBLE COPOLYMERS COMPRISING AN AMPHOLYTIC IMIDAZOLIUM INNER SALT

This application is a division of application Ser. No. 07/873,135, filed Apr. 24, 1992, now U.S. Pat. No. 5,270,382

FIELD OF THE INVENTION

The present invention relates to a hostile environment stable water soluble polymer composition, to a method of making the composition, to a gelable composition useful for permeability corrections of high temperature oil reservoirs, and to a well treating fluid composition.

BACKGROUND OF THE INVENTION

Many synthetic polymers have been developed and used in processes for the recovery of natural resources. Generally a desirable property is that such polymers impart to a liquid an increased viscosity when a relatively small quantity of the polymer is added, and preferably at a minimal cost. There is an increasing demand for such polymers which will withstand hostile environments including, e.g. high temperatures, high salinity and high content of multivalent metal cations, commonly known as "hardness ions", as well as the high acidity, temperature and shear conditions encountered in processes such as acid fracturing.

It is also well known that undesirable water recovered from oil wells can result from the infiltration of naturally occurring subterranean water, or, in the case of waterflooding or steam flooding operations, from the injected drive water or steam. In both cases, water or steam flows through zones of high permeability to the producing well bores whereby oil in less permeable zones is bypassed. In water or steam flooding operations, the more permeable zones of subterranean formations tend to take most of the injected flood water or steam. While this is acceptable initially when the oil contained in the high permeability zones is being swept therefrom, it subsequently becomes undesirable as the oil in such zones becomes depleted. From that point on, the water or steam flood provides little benefit in enhancing oil production.

Methods and compositions for accomplishing near well and in depth plugging of high permeability zones by forming gels therein have been developed and used. The formation of the gels causes high permeability zones to be plugged or at least lowered in permeability whereby subsequently injected flood water or steam is caused to enter previously bypassed zones. This in turn causes the flood water or steam to mobilize increased amounts of oil which are recovered from the subterranean formation.

A variety of methods and polymer compositions which gel in situ to reduce the permeability of high permeability zones in subterranean formations have been utilized successfully for improving the sweep efficiency of water or steam flooding and/or reducing the production of naturally occurring formation waters, but such methods and compositions have generally been unsuccessful in applications requiring the formation of gels deep in high permeability zones having high temperatures, i.e., temperatures above about 160° F. It would therefore be a significant contribution to the art to provide a polymer composition and a method for altering subterranean formation permeability at temperatures at 160° F. and higher.

Polymers also have applications in well-treating fluids such as drilling fluids, completion fluids, work over fluids, stimulation fluids, and cement slurries which serve a number of functions. Drilling fluids cool the bit, bring the cuttings to the surface, and keep the oil, gas, and water confined to their respective formations during the drilling process. In addition, a highly important property of a drilling fluid is the ability to form an impervious layer upon the permeable walls of the borehole, which inhibits the ingress of water from the drilling fluid into the formation. Excessive water loss from the drilling fluids can cause severe problems. For example, filter cake buildup can become so thick that the drilling pipe may become stuck; also, there may be great difficulty in withdrawing the pipe from the hole. Further, high water losses can cause sloughing and caving in the shale formations.

A completion fluid is left behind the tubing in well completion for pressure control or corrosion prevention. This fluid should have the following desirable qualities: thermal stability, ease of re-entry for work over operations, and controlling formations. Because of the economics involved, the drilling fluid used to drill the well is also used as a completion fluid. If the drilling fluid is unsatisfactory to leave in the hole, a special fluid may be prepared.

In general, the well treating fluids usually are composed of fresh water or brine and solids suspensions and are fluids that are regulated at the well location by addition of viscosifiers, fluid loss control agents, salts, dispersants, lubricants, shale inhibitors, corrosion inhibitors, surface active agents, weighting materials, flocculants, and other additives of various kinds in accordance with the particular intended use.

A variety of polymer compositions have been utilized successfully as fluid loss control agent or as viscosifier to provide suspension of solids. However, none of these polymers has performed adequately in every situation. Therefore, it would be a valuable contribution to the art to provide a polymer composition which reduces fluid loss and provide suspension properties in hard brine environments.

Polymers also have applications in well treating fluids and waste water purification for removing undesired solids by "flocculation" of the solids. A number of polymers are being used as flocculants. It would be a useful contribution to the art if a polymer composition were provided that acts as a flocculant.

SUMMARY OF THE INVENTION

It is therefore an object of the present invention to provide a water soluble polymer composition that is stable under hostile environment conditions. Another object of the invention is to provide a method for preparing the water soluble polymer composition. It is also an object of the invention to provide a gelable composition containing the water soluble polymer composition. A further object of the invention is to provide a method for the preparation of the gelable composition for use in oil field operations. Yet another object of the invention is to provide a composition containing the water soluble polymer composition for reducing drilling fluid loss and providing suspension properties in well treating fluids. Still a further object of the invention is to provide a polymer composition for use as a flocculant for removing undesired solids from water.

Other aspects and objects of this invention will become apparent here and after as the invention is more fully described in the following summary of the invention and detailed description of the invention, examples, and claims.

According to a first embodiment of the present invention, a polymer composition is provided which comprises repeating units from: (a) an ampholytic monomer having the formula of:

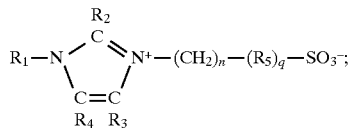

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer selected from the group consisting of acrylamide, methacrylamide, N,N-dimethylacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone.

According to a second embodiment of the present invention, a gelable composition for permeability corrections of high temperature reservoirs comprises: (A) a water soluble polymer prepared by copolymerization of (a) an ampholytic monomer having the formula of

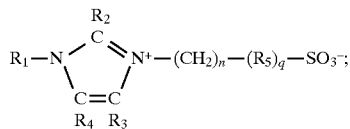

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer selected from the group consisting of acrylamide, methacrylamide, and N,N-dimethylacrylamide; and optionally (c) one or more monomers selected from the group consisting of acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone; (B) a water dispersible first crosslinking compound selected from the group consisting of furfuryl alcohol, an aminobenzoic acid, aspirin, ArOC(O)R, HOArR', and HOArC(O)OR' where Ar represents a phenyl group; R is a $C_1$–$C_6$ alkyl; R' is a hydrogen, a phenyl group, or a $C_1$–$C_6$ alkyl; and R' and C(O)OR can be at ortho, meta, or para position with respect to the OH group; (C) a water dispersible second crosslinking component selected from the group consisting of an aldehyde and an aldehyde generating compound; and (D) water.

According to a third embodiment of the present invention, there is provided a polymer additive composition for reducing fluid loss and/or improving suspension properties of well treating fluids which are subject to hostile environments. The composition comprises (A) a polymer prepared by copolymerization of (a) an ampholytic monomer having the formula of:

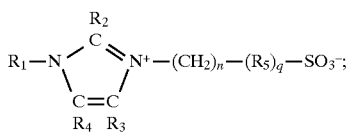

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer selected from the group consisting of acrylamide, methacrylamide, N,N-dimethylacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone; and (B) water.

According to a fourth embodiment of the present invention, a process is provided for reducing the permeability of a watered-out or oil-depleted zones in high temperature subterranean formation comprising injecting a gelable composition comprising: (A) a water soluble polymer prepared by copolymerization of (a) an ampholytic monomer having the formula of

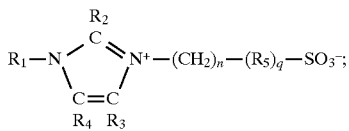

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer selected from the group consisting of acrylamide, methacrylamide, and N,N-dimethylacrylamide; and optionally (c) one or more monomers selected from the group consisting of acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone; (B) a water dispersible first crosslinking compound selected from the group consisting of furfuryl alcohol, an aminobenzoic acid, aspirin, ArOC(O)R, HOArR', and HOArC(O)OR' where Ar represents a phenyl group; R is a $C_1$–$C_6$ alkyl; R' is a hydrogen, a phenyl group, or a $C_1$–$C_6$ alkyl; and R' and C(O)OR' can be at ortho, meta, or para position with respect to the OH group; (C) a water dispersible crosslinking component selected from the group consisting of an aldehyde and an aldehyde generating compound; and (D) water.

DETAILED DESCRIPTION OF THE INVENTION

The first embodiment of the present invention provides a water soluble polymer which is stable under hostile environments, i.e., those well under adverse conditions such as high temperature, high salinity and/or high concentration of hardness ions. The term "stable" is used herein, unless otherwise indicated, to mean that the viscosity of the polymers remains substantially the same, or increases, when the polymers are aged under hostile environments.

The term "polymer" used here refers to a polymer having repeating units derived from two or more different monomers, i.e. copolymers, terpolymers, tetrapolymers, etc., and includes those prepared by copolymerization of an effective amount of each of the following monomers to produce a polymer that has the above-described properties: (a) an ampholytic monomer having the formula of:

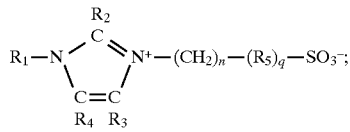

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one olefinic comonomer selected from the group consisting of acrylamide, methacrylamide, N,N-dimethylacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone.

Unless otherwise indicated, the term "alkali salts" is generically used in this application to mean salts containing ammonium cation and alkali metal cations such as lithium, sodium and potassium.

The ampholytic monomer of the present invention is preferably in aqueous solution in hydroxide form selected from the group consisting of 1-vinyl-3-(3-sulfopropyl)-imidazolium hydroxide, 1-vinyl-3-(4-sulfobutyl) imidazolium hydroxide, 1-vinyl-2-methyl-3-(3-sulfopropyl) imidazolium hydroxide, 1-vinyl-2-methyl-3-(4-sulfobutyl) imidozolium hydroxide, 1-vinyl-3-(2-sulfobenzyl) imidazolium hydroxide, 2-vinyl-3-(3-sulfopropyl) imidazolium hydroxide, 2-vinyl-3-(4-sulfobutyl) imidazolium hydroxide, 4(5)-vinyl-1-(3-sulfopropyl) imidazolium hydroxide, 4(5)-vinyl-1-(4-sulfobutyl) imidazolium hydroxide, 1-methyl-2-vinyl-3-(3-sulfopropyl) imidazolium hydroxide and 1-vinyl-3-(4-sulfobutyl) imidazolium hydroxide. The presently preferred ampholytic monomer is 1-vinyl-3-(3-sulfopropyl)-imidazolium hydroxide (hereinafter referred to VSPIH).

The polymers of the present invention are generally prepared by mixing the various monomers in desired stoichiometric ratios in aqueous solution and then initiating the free-radical copolymerization. The copolymerization of a ampholytic monomer with an olefinic comonomer can be achieved by any of the well known free-radical polymerization techniques in solution, suspension, or emulsion environment. Well known azo compounds commonly employed to initiate free radical polymerization reactions include 2,2'-azobis(N,N'-dimethylisobutyramidine) dihydrochloride, azobisisobutyronitrile, 4,4'-azobis(4-cyanovaleric acid), 2,2'-azobis(2,4-dimethyl(4-methyoxyvaleronitrile)), 2,2'-azobis(2,4-dimethylvaleronitrile), 2,2'-azobis(2-amidinopropane)-dihydrochloride, 2-t-butylazo-2-cyano-4-methoxy-4-methylpentane, and 2-t-butylazo-2-cyano-4-methylpentane, and 4-t-butylazo-4-cyanovaleric acid. Well known inorganic peroxide compounds commonly employed to initiate free radical polymerization reactions include hydrogen peroxide, alkali metal persulfates, alkali metal perborates, alkali metal perphosphates, and alkali metal percarbonates. Well known organic peroxide compounds commonly employed to initiate free radical polymerization reactions include lauryl peroxide, 2,5-dimethyl-2,5-bis(2-ethylhexanoylperoxy) hexane, t-butylperoxypivilate, t-butylperoctoate, p-methane hydroperoxide, and benzoylperoxide. The compound t-butylhyponitrite is a well known alkyl hyponitrite commonly employed to initiate free radical polymerization reactions. Furthermore, ultraviolet light is commonly employed to initiate free radical polymerization reactions. In addition, such other methods of copolymerization as would have occurred to one skilled in the art may be employed, and the present invention is not limited to the particular method of preparing the polymer set out herein.

These inventive copolymers can contain an olefinic comonomer with amide, nitrile, carboxylic acid, or sulfonic acid functionalities which can optionally be at least partially hydrolyzed and/or neutralized by heating with aqueous base such as aqueous sodium hydroxide or aqueous potassium hydroxide. The degree of hydrolysis and/or neutralization can be controlled by stoichiometrically limiting the amount of base relative to the amount of amide, nitrile, carboxylic acid, and sulfonic acid functionalities. If the hydrolysis is carried out under acidic conditions, the amide and nitrile functionalities can be converted to carboxylic acid functionalities without neutralizing the carboxylic acid or sulfonic acid functionalities of the polymer.

The mole percent of the ampholytic monomer in the polymer of the present invention ranges from about 2 to about 90, preferably from about 3 to about 70, and most preferably 5 to 50. The mole percent of the comonomers(s) ranges from about 10 to 98, preferably from about 30 to 97, and most preferably from 50 to 95. The total amount of the ampholytic monomer and comonomer equals 100 mole percent.

The second embodiment of the present invention provides a gelable composition for reducing the permeability of a watered-out oil-depleted zone in high temperature subterranean formation comprises injecting a gelable composition comprising: (A) a water soluble polymer prepared by copolymerization of (a) an ampholytic monomer having the formula of:

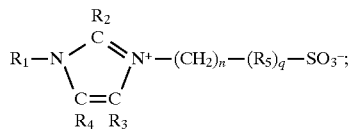

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 to 1; (b) at least one comonomer selected from the group consisting of acrylamide, methacrylamide, and N,N-dimethylacrylamide; and optionally (c) one or more monomers selected from the group consisting of acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone; (B) a water dispersible first crosslinking compound selected from the group consisting of furfuryl alcohol, an aminobenzoic acid, aspirin, ArOC(O)R, HOArR', and HOArC(O)OR' where Ar represents a phenyl group; R is a $C_1$–$C_5$ alkyl; R' is a hydrogen, a phenyl group, or a $C_1$–$C_5$ alkyl and R' and C(O)OR' can be at ortho, meta, or para position with respect to the OH group; (C) a water dispersible second crosslinking component selected from the group consisting of an aldehyde and an aldehyde-generating compound; and (D) water.

The preparation of the water soluble polymer is the same as that described above.

The term "water dispersible" used herein is to describe a component of the composition that is truly water soluble or is dispersible in water to form suspension. Suitable first crosslinking compounds include, but not limited to, phenol, phenyl acetate, phenyl propionate, phenyl butyrate, p-hydroxybenzoic acid, methyl p-hydroxybenzoate, methyl o-hydroxybenzoate, phenyl salicylate, p-aminobenzoic acid, o-aminobenzoic acid, salicylic acid, salicylamide, salicyl alcohol, furfuryl alcohol, aspirin, ethyl p-hydroxybenzoate, o-hydroxybenzoate, hexyl p-hydroxybenzoate, and mixtures thereof. Presently preferred water dispersible aromatic compounds are phenol, phenyl acetate phenyl salicylate, salicylic acid, salicylamide, aspirin, salicyl alcohol, furfuryl alcohol, p-aminobenzoic acid, o-aminobenzoic acid, and methyl p-hydroxybenzoate.

Any water dispersible aldehyde, its derivative, or aldehyde-generating compound that can be converted into aldehyde can be utilized in those embodiments of the invention involving a crosslinking agent of the present invention. Thus, suitable aldehydes or aldehyde-generating compounds can be selected from the group consisting of aliphatic monoaldehydes, aromatic monoaldehydes, aliphatic dialdehydes, aromatic dialdehydes, and their derivatives. Preferred aldehydes and their derivatives can be selected from the group consisting of formaldehyde, paraformaldehyde, acetaldehyde, propionaldehyde, decanal, glutaraldehyde, terephthaldehyde, hexamethylenetetramine, and mixtures thereof.

The water soluble polymer is present in the composition in those embodiments of the invention involving a crosslinking agent in the range of from about 0.05 to about 10 weight percent, preferably about 0.1 to about 7 weight percent, and most preferably 0.2 to 5 weight percent based on the total weight of the composition. The concentration of polymer in the composition depends to some degree upon the molecular weight of the polymer. A high molecular weight results in a higher viscosity of the resulting gel for a particular concentration of polymer.

The water dispersible first crosslinking compound is present in the composition in the range of from about 0.005 to about 5.0 weight percent, preferably about 0.01 to about 2.0 weight percent, and most preferably in the range of 0.03 to 1.0 weight percent based on the total weight of the composition.

The second crosslinking component, i.e., aldehyde or aldehyde-generating compound, of the present invention is present in the composition in the range of from about 0.005 to about 5.0 weight percent, preferably about 0.01 to about 2.0 weight percent, and most preferably in the range of 0.03 to 1.0 weight percent based on the total weight of the composition.

Water generally makes up the rest of the composition.

Any suitable method can be employed for preparing the composition of the invention. Thus, any suitable mixing technique or order of addition of the components of the composition to each other can be employed. However, it is generally preferred that the polymer be dispersed in water before contacting the polymer with the other components. The mixing order can vary with the type of polymer used.

The use of gelled polymers to alter the water permeability of underground formations is well known to those skilled in the art. Generally, an aqueous solution containing the polymer and crosslinking agents are pumped into the formation so that it can diffuse into the more water swept portions of the formation and alter water permeability by gelling therein.

The present invention related to the gellable compositions can be used in a similar manner. An aqueous solution containing the second crosslinking component such as bexamethylenetetramine (an aldehyde precursor), the water soluble polymer, and the first crosslinking compound such as an aminobenzoic acid compound, furfuryl alcohol or phenol can be pumped into the formation so that it alters the water permeability of the formation in a similar manner when gelation takes place. The aqueous solution containing hexamethylenetetramine, the water soluble polymer, and aminobenzoic acid compound, furfuryl alcohol or phenol can be pumped into the formation in one slug, or alternatively the components may be sequentially injected in a manner to provide an appropriate concentration in the formation.

The nature of the underground formation treated is not critical to the practice of the present invention. The organic crosslinkers will gel the water-soluble polymers in, and the above described gelable composition can be injected into, fresh water, salt water, or brines, as well as at a temperature range of from about 150° F. to about 350° F., and preferably in formations with a temperature of about 200° F. to about 300° F.

According to a third embodiment of the present invention, it is provided a polymer additive composition for reducing fluid loss and/or improving suspension properties of well treating fluids which are subject to hostile environments. The polymer is prepared by copolymerization of (a) an ampholytic monomer having the formula of:

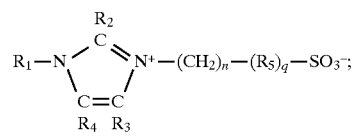

where one and only one of the substituted groups $R_1$, $R_2$, $R_3$ and $R_4$ must be a vinyl group, the rest can be the same or different and can be hydrogen or a $C_1$–$C_3$ alkyl group; $R_5$ is a phenyl group; n is $\geq 1$ and $\leq 6$; and q is 0 or 1; (b) at least one comonomer selected from the group consisting of acrylamide, methacrylamide, acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, and N-vinyl-2-pyrrolidone.

The preparation of the polymer is the same as that described in the first embodiment of the invention.

The type of well treating fluid to which the polymer additive is added is not critical. Thus, examples of suitable well treating fluids are brine, brine viscosified with a polymer, calcium treated fluids, potassium treated fluids cement-water slurries, and emulsions.

A well treating fluid of the present invention is comprised of water, at least one insoluble particulate and a polymer additive of the present invention for reducing fluid loss and/or improving suspension properties of the well treating fluid in high temperature subterranean environments. The water utilized in forming the well treating fluid can be fresh water or salt water including oil field brines and sea water. The insoluble particulate can be solids drilled from formations or any of the various components used in drilling fluids, completion fluids, stimulation fluids, cement slurries and other similar fluids.

In addition to the foregoing, the well treating fluids can include a variety of other components and additives to achieve desired results. The commonly used components include viscosifiers, fluid loss control agents, salts, dispersants, lubricants, surface active agents, weighting materials, flocculants, and other similar components.

Generally, the polymer additive included in the well treating fluid can be in an amount ranging from about 0.05 to about 25 pounds per barrel (i.e. about 0.01 to about 10 weight %), preferably 0.10 to 20 pounds per barrel of well treating fluid.

The following examples are intended to illustrate the advantages of the present invention, but are not intended to unduly limit the invention.

EXAMPLE I

This example is to illustrate the preparation and characterization of an ampholytic monomer, VSPIH. About 30.77 g (0.327 mol) of freshly distilled 1-vinyl imidazole was added to a 500 ml solution of 40.0 g (0.327 mol) 1,3-propane sultone in dry ethyl acetate. After reaction had undergone at room temperature under reflux condenser and constant stirring for 8 days, a finely divided white precipitate was obtained. Upon filtering followed by washing thoroughly with ethyl acetate and vacuum drying, a crude product was obtained in 76% yield. A portion of the crude product was recrystallized from absolute ethanol. Melting point (186° C.) and elemental compositions were found essentially the same for both crude and recrystallized products (Analysis calculated for $C_8H_{12}N_2SO_3$: C, 44.3%; H, 5.60%; N, 12.95%; S, 14.83%. Found: C, 44.40%; H, 5.67%; N, 12.83%; S, 14.70%). The monomer and its precursors were further analyzed by HPLC using UV detector set at 225 nm wavelength and the results showed 99.9% purity of the monomer. Thus, it was decided to use the crude product without further purification.

EXAMPLE II

This example illustrates the preparation of copolymers acrylamide and VSPIH, and measurement of viscosities thereof after a lengthy aging at high temperature in hostile environments.

The inventive copolymers were prepared by mixing the monomers in the proportions given in Table I in an aqueous solution of deionized water. The monomers were present in about 30–40 weight percent relative to the amount of deionized water. The free radical polymerization was initiated with commercially available azo compound 2,2'-azobis (N,N'dimethylisobutyramidine) dihydrochloride. About 0.16 mole percent based on the total moles of the monomers of the azo free-radical initiator was employed. The reaction mixture was then degassed by bubbling nitrogen through the mixture for 15 minutes. The degassed reaction mixture was shaked at room temperature for 5 days. The treatment produced hazy or white hard gels. The gel was then dissolved by stirring in a large volume of synthetic ocean water containing an excess amount of KBr salt for 5–6 hours at room temperature. Synthetic ocean water was prepared by dissolving 755 grams of sea-salt in 18 liters of deionized water. The resulting solution contained 10550 ppm $Na^+$, 437 ppm $Ca^{++}$, 1256 ppm $Mg^{++}$, 18540 ppm $Cl^-$, 2828 ppm $SO_4^{--}$ and 145 ppm $HCO_3$ ions (ppm is parts per million). The polymer solution was then transferred to a dialysis bag with a molecular weight cut-off 12,000–14,000 and dialyzed for 5 days against distilled water. The solid polymer was recovered by freeze-drying the dialyzed polymer solution.

The dried polymers were tested for stability under hostile environments. The polymer's solution viscosity was used for the measurement of polymer stability. An aliquot sample of polymer solution was prepared by stirring about 1 to 3 grams of the dried polymer in 100 ml of synthetic ocean water at room temperature. The viscosity of the resulting polymer solution was measured as a function of shear rate at 77° F. using a Brookfield LVT model viscometer to establish zero time properties. An aliquot of about 25 ml of the polymer solution was transferred to a 50-ml ampule. The ampule was capped and degassed by bubbling nitrogen through the polymer solution for 30 minutes. The ampule was then placed in an electric oven maintained at 250° F. After the specified period of time shown in Table I, the ampule was removed from the oven and allowed to cool to room temperature. The viscosity as a function of shear rate was again measured at 77° F. The results are shown in Table I.

TABLE I

Aging Results of Various Acrylamide/VSPIH Copolymers

| Run No. | AAM | VSPIH | Days Aged at 250° F. | Viscosity (CP) Shear Rate (sec$^{-1}$) | | | | | | | |
|---|---|---|---|---|---|---|---|---|---|---|---|
| | mole % | | | 0.4 | 0.7 | 1.8 | 3.7 | 7.3 | 14.7 | 36.7 | 73.4 |
| 1 | 100 | 0 | 0 | 130 | 126 | 124 | 121 | — | — | — | — |
| | | | 7 | 1 | 1 | 1 | 1 | — | — | — | — |
| 2 | 0 | 100 | 0 | — | — | — | — | 7 | 7 | 7 | 7 |
| | | | 33 | — | — | — | — | 7 | 7 | 7 | 7 |
| 3 | 95 | 5 | 0 | 754 | 710 | — | — | — | — | — | — |
| | | | 30 | 1114 | — | — | — | — | — | — | — |
| 4 | 90 | 10 | 0 | 310 | 307 | 305 | — | — | — | — | — |
| | | | 30 | 1940 | — | — | — | — | — | — | — |
| 5 | 87 | 13 | 0 | 138 | 136 | 134 | 132 | — | — | — | — |
| | | | 30 | 170 | 165 | 160 | 153 | — | — | — | — |
| 6 | 81 | 19 | 0 | 6 | 6 | 6 | 5 | 5 | 5 | 5 | 5 |
| | | | 30 | 6 | 6 | 6 | 6 | 5 | 5 | 5 | 5 |
| 7 | 77 | 23 | 0 | 6 | 5 | 5 | 5 | 4 | 4 | 4 | 4 |

TABLE I-continued

Aging Results of Various Acrylamide/VSPIH Copolymers

| Run No. | AAM | VSPIH | Days Aged at 250° F. | Viscosity (CP) Shear Rate (sec$^{-1}$) | | | | | | | |
|---|---|---|---|---|---|---|---|---|---|---|---|
| | mole % | | | 0.4 | 0.7 | 1.8 | 3.7 | 7.3 | 14.7 | 36.7 | 73.4 |
| | | | 39 | 4 | 4 | 4 | 4 | 4 | 4 | 4 | 4 |
| 8 | 70 | 30 | 0 | 34 | 32 | 28 | 28 | 27 | 27 | — | — |
| | | | 30 | 56 | 55 | 53 | 53 | 52 | — | — | — |
| 9 | 70 | 30 | 0 | — | 15 | 14 | 12 | 12 | 12 | 12 | — |
| | | | 48 | — | 16 | 16 | 15 | 15 | 15 | 15 | — |
| 10 | 70 | 30 | 0 | — | — | — | 13 | 13 | 13 | 13 | — |
| | | | 30 | — | — | — | 13 | 13 | 13 | 13 | — |
| | | | 60 | — | — | — | 13 | 13 | 13 | 13 | — |
| | | | 90 | — | — | — | 13 | 13 | 13 | 12 | — |
| 11 | 69 | 31 | 0 | 16 | 16 | 16 | 16 | 16 | 16 | 16 | — |
| | | | 37(300° F.) | 18 | 18 | 18 | 18 | 18 | 18 | 18 | — |

AAM = Acrylamide.
VSPIH = 1-vinyl-3-(3-sulfopropyl)imidazolium hydroxide.

The results in Table I show that solution of homopolymer of acrylamide completely lost its viscosity upon aging. However, essentially all copolymers of acrylamide and VSPIH retained their initial viscosities upon aging. Some of them (runs 3, 4, 5 and 8) increased their solution viscosities remarkably after one month aging in the hostile environments and in every case they performed better than the homopolymer.

EXAMPLE III

This example illustrates the preparation of copolymers of VSPIH with comonomers other than acrylamide, and viscosities thereof after a lengthy aging at high temperature in hostile environments. The inventive copolymers were prepared according to the method described in Example II, except that the copolymers were prepared by mixing the monomers in the proportions given in Table II. The procedures for aging and viscosity measurement were also same as described in Example II. The aging results are given in Table II.

TABLE II

Aging Results of Various VSPIH Copolymers

| VP | VSPIH | Na-AMPS | AAM | Days Aged at 250° F. | Viscosity (CP) Shear Rate (sec$^{-1}$) | | | | |
|---|---|---|---|---|---|---|---|---|---|
| | mole % | | | | 3.7 | 7.3 | 14.7 | 36.7 | 73.4 |
| 90 | 10 | — | — | 0 | 5 | 5 | 5 | 5 | 5 |
| | | | | 21 | 6 | 6 | 5 | 5 | 5 |
| 52 | 48 | — | — | 0 | 5 | 5 | 4 | 4 | 4 |
| | | | | 21 | 5 | 4 | 4 | 4 | 4 |
| — | 25 | 75 | — | 0 | 9 | 9 | 8 | 8 | 8 |
| | | | | 33 | 8 | 7 | 7 | 7 | 7 |
| — | 50 | 50 | — | 0 | 7 | 6 | 6 | 6 | 6 |
| | | | | 33 | 5 | 6 | 6 | 6 | 6 |
| 25 | 24 | — | 51 | 0 | 9 | 9 | 8 | 8 | 8 |
| | | | | 21 | 13 | 13 | 13 | 13 | — |
| 25 | 24 | — | 51 | 0 | 36 | 36 | 36 | — | — |
| | | | | 21 | 48 | 47 | 47 | — | — |

AAM = Acrylamide.
VSPIH = 1-vinyl-3-(3-sulfopropyl)imidazolium hydroxide.
VP = N-vinyl-2-pyrrolidone.
Na-AMPS ® = Sodium salt of 2-acrylamido-2-methylpropane sulfonic acid
(Note: AMPS ® is a trademark of Lubrizol Corporation for 2-acrylamido-2-methylpropane sulfonic acid.)

Table II again demonstrates that copolymers and terpolymers containing VSPIH are stable in hostile environments.

EXAMPLE IV

The purpose of this example is to illustrate the gelation of a water-soluble polymer prepared from acrylamide and VSPIH in the presence of phenol and formaldehyde.

A 2% solution of a copolymer composed of 70 wt % of acrylamide and 30 wt % of VSPIH was prepared by mixing 4.0 g of the copolymer with 196 g of synthetic sea water (described above).

Aliquot of 88% phenol of 37% formaldehyde were added to an ampule containing 20 ml of the polymer and synthetic sea water mixture described above, to provide a concentration of phenol and formaldehyde shown in Table III.

Each ampule was sealed under nitrogen and then placed upright in compartmented aluminum boxes with relief holes and placed in ovens heated to and held at 250° F. Periodically, the ampules were removed from the oven and the mechanical strength of the gels was determined behind a protective shield.

As crosslinking developed, small microgels or granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each ampule horizontally behind a shield for safety, allowing the hot gelling composition to move to its equilibrium position and then measuring the length of the tongue formed. As gelation progressed with time, stronger gels and shorter tongue lengths were developed. Additionally, liquid content in the ampules were measured by the length of the liquid with the ampules in vertical positions. The mechanical strength is expressed mathematically as $$\text{Percent Gel Strength} = (AL - TL) \times 100/AL$$

where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The tongue length results are shown in Table III.

TABLE III

Gelation of 2.0% 70/30 AAM/VSPIH Copolymer Solution in Synthetic Ocean Water with Phenol and Formaldehyde at 250° F.

| X-Linker Conc* (ppm) Aging Time (days) | Tongue Length or Gel Length (GL) in Centimeters | |
|---|---|---|
| | 500 | 2,000 |
| 0.1 | NG | NG |
| 0.2 | NG | NG |
| 0.8 | 18.7 | 0.0 |
| 1.2 | 2.3 | 0.0 |
| 1.8 | 0.9 | 0.0 |
| 2.2 | 0.5 | 0.0 |
| 4.8 | 0.4 | 0.0 |
| 7.8 | 0.6 | 0.0 |
| 18.9 | 0.6 | 0.5 + 0.1L |
| 48.0 | 0.8 | 7.4GL + 0.9L |
| 55.0 | 0.8 | 7.2GL + 0.8L |
| 93.0 | 0.7 | 7.2GL + 0.7L |
| 120.0 | 0.8 | 7.4GL + 0.7L |
| 191.0 | 1.0 | 7.3GL + 0.7L |
| 421.0** | 1.8 + 0.2L | 7.3GL + 0.9L |
| 1052.0 | 7.9 | 8.9GL + 0.3L |

*The numbers given represent the concentration of each crosslinker.
**After measuring the tongue lengths, the ampules were accidentally placed in a 200° F. oven.
AAM = Acrylamide.
NG = No Gel, GL = Gel Length.
L = The height of liquid separated from the gel, measured when the ampule was placed at vertical position.

The results shown in Table III indicate that the inventive composition gelled quickly at 250° F. at 2,000 ppm concentration for each crosslinker. Similar results were obtained at much lower concentration (500 ppm) for each crosslinker. The results also show very strong (i.e. very short tongue length) gels were formed.

Examples V–VII illustrate that the inventive drilling fluid additive is very effective in preventing water loss in different drilling fluids. All test samples were prepared by mixing for approximately 90 minutes with a multimixer.

EXAMPLE V

Test samples were prepared by mixing with 340 ml of tap water, 12.5 g of bentonite, 14.3 g of sea salt, and 1.5 g of Drispac® Regular Polymer (Polyanionic Cellulose from Drilling Specialties Company, Bartlesville, Okla.). Polymer of the present invention was mixed in the amount given in Table IV. Next, 15 g of drilled solids comprised primarily of illite clay was mixed with each sample and pH was adjusted to around 9.0 with 50% wt/vol NaOH solution. All samples were tested immediately after they were prepared for rheology and water loss in accordance with API RP 13B-1 test method. Then, they were aged 16 hours at 275° F. in stainless steel cells. After cooling to room temperature, they were stirred two minutes and tested. The results are shown in Table IV. From these results it can be seen that the inventive polymer is effective for providing viscosities and reducing water loss in sea water mud. For example, the inventive polymer reduces water loss by more than 80% (run 3, Table IV) at both room temperature as well as high temperature-high pressure after aging at 275° F. compared to control (run 1, Table IV).

TABLE IV

Tests In Simulated Sea Water Mud

| Run | Polymer (g) | Initial Results | | | Results After Aging 16 hrs at 275° F. | | | |
|---|---|---|---|---|---|---|---|---|
| | | PV[a]/YP[b] | Gels[c] | RTWL[d] | PV/YP | Gels | RTWL | HTHPWL[e] |
| 1 | None | 12/6 | 1/2 | 8.2 | 5/1 | 1/1 | 20.2 | 116.0 |
| 2 | Inventive Polymer[f], 3.0 | 22/20 | 2/8 | 7.2 | 9/7 | 1/3 | 15.6 | 75.0 |
| 3 | Inventive Polymer[f], 6.0 | 34/39 | 3/7 | 4.5 | 29/17 | 2/4 | 3.4 | 22.6 |

[a]PV represents plastic viscosity in centipoise.
[b]YP represents yield point in lb/100 ft$^2$.
[c]Gels represent gel strengths in lb/100 ft$^2$, 10 seconds and 10 minutes.
[d]RTWL represents API water loss at room temperature, ml/30 minutes.
[e]HTHPWL represents API water loss at 300° F. and 500 psi, ml/30 minutes.
[f]Inventive polymer, copolymer of acrylamide and VSPIH (70 and 30 mole percent, respectively).

EXAMPLE VI

A sample of North Dakota brine was prepared by dissolving 1235 g sodium chloride, 308 g calcium chloride, and 78.5 g magnesium chloride in 5,000 ml of tap water. Samples of the brine mud were prepared by mixing 6 g of attapulgite clay with 270 ml of brine. Polymers given in Table V were then mixed thoroughly with the brine muds. Next, 12 g of solids comprised principally of calcium montmorillonite and aluminum silicate marketed under the trade name "REV-DUST" by the Milwhite Co. of Houston, Tex., was mixed with each sample to simulate drill solids. Samples were then tested for rheology and water loss. After they were aged 16 hours at 176° F. and cooled to room temperature, they were retested after stirring 2 for minutes. The test results are shown in Table V below. From these results it can be seen that the inventive polymer provides viscosities and reduces water loss in brine mud. The inventive polymer is more effective than ASP 700 polymer (a polymer being marketed by Nalco Chemical Co., Sugarland, Tex.) and it also performs better than Driscal® Polymer (an emulsion polymer, about 33% activity, being marketed by Drilling Specialties Co., Bartlesville, Okla.).

TABLE V

Tests In Simulated North Dakota Brine Mud[a]

| Run | Polymer (g) | Initial Results | | | Results After Aging 16 hrs at 176° F. | | |
|---|---|---|---|---|---|---|---|
| | | PV/YP | Gels | RTWL | PV/YP | Gels | RTWL |
| 1 | None | 3/4 | 2/6 | 148.6 | 3/4 | 2/4 | 187 |
| 2 | ASP 700, 4.0 | Not Tested | | | 9/4 | 3/6 | 101.5 |
| 3 | Inventive Polymer, 4.0 | 21/18 | 6/9 | 4.4 | 27/11 | 2/2 | 3.2 |
| 4 | Driscal ® Polymer, 8.0 | 28/12 | 2/2 | 3.2 | 24/25 | 6/10 | 4.2 |

[a]See Table IV for footnotes.

EXAMPLE VII

Samples of simulated Michigan Brine mud were prepared by mixing with 250 ml of tap water, 86.5 g calcium chloride, 21.5 g magnesium chloride, 11.75 g sodium chloride, 6 g of attapulgite clay, and 12 g of bentonite. Inventive polymer (copolymer of acrylamide and VSPIH in a 70:30 mole % ratio, respectively) given in Table VI was then mixed in. Samples were tested for rheology immediately after they were prepared. They were then aged 16 hours at 176° F., cooled to room temperature, and tested after stirring for 2 minutes. The results are shown in Table VI. From these results it can be seen that the inventive polymer is effective for providing viscosities and reducing water loss in extremely hostile environment (hard brine mud).

TABLE VI

Tests In Simulated Michigan Brine Mud[a]

| Run | Polymer (g) | Initial Results | | | Results After Aging 16 hrs at 176° F. | | |
|---|---|---|---|---|---|---|---|
| | | PV/YP | Gels | RTWL | PV/YP | Gels | RTWL |
| 1 | None | 3/5 | 2/5 | — | 4/3 | 2/4 | 128 |
| 2 | Inventive Polymer, 4.0 | 28/13 | 1/3 | — | 34/16 | 1/3 | 1.6 |

[a]See Table IV for footnotes.

EXAMPLE VIII

Test samples were prepared by mixing with 350 ml of tap water, 7.5 g of bentonite and 15 g of solids comprised principally of illite clay. Polymer of the present invention was mixed in one of the sample in the amount given in Table VII (run 2). All samples were tested immediately after they were prepared. The results are shown in Table VII. The addition of polymer caused flocculation of solids and, therefore, the fresh water mud sample lost its fluid loss completely. These results indicate that the inventive polymer can be used as a flocculent for removing undesired solids from fresh water.

TABLE VII

Use of Inventive Polymer as Flocculant[a]

| Run | Polymer (g) | RTWL | Observations |
|---|---|---|---|
| 1 | None | 29.4 | Appeared normal |
| 2 | Inventive Polymer (4.0) | NC* | Very large flocs of solids indicating flocculation |

[a]See Table IV for footnotes.
*NC represents no control (water loss was 40 ml in only 30 seconds).

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the claims.

That which is claimed is:

1. A process for reducing the permeability of water-out or oil-depleted zones in a high temperature subterranean formation comprising injecting a composition into said formation which forms a gel in said formation, wherein said composition comprises: (A) a water soluble polymer prepared by copolymerization of (a) an ampholytic monomer having the formula of:

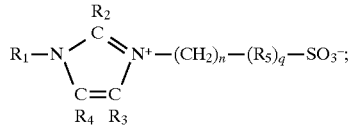

wherein one and only one of the substituted groups $R_1$, $R_2$, $R_3$ and $R_4$ must be a vinyl group, the rest can be the same or different and is a hydrogen or a $C_1$–$C_3$ alkyl group; $R_5$ is a phenyl group; n is $\geq 1$ and $\leq 6$; and q is 0 or 1; and (b) at least one comonomer having an ethylenic linkage; (B) a water dispersible first crosslinking compound selected from the group consisting of furfuryl alcohol, an aminobenzoic acid, aspirin, ArOC(O)R, HOArR', HOArC(O)OR', and combinations thereof; wherein Ar represents a phenyl group; R is a $C_1$–$C_6$ alkyl; R' is a hydrogen, a phenyl group, or a $C_1$–$C_6$ alkyl; and R' and C(O)OR' can be at ortho, meta, or para position with respect to the OH group; (C) a water dispersible second crosslinking component selected from the group consisting of an aldehyde, an aldehyde generating compound and combinations thereof; and (D) water.

2. A process according to claim 1 wherein said ampholytic monomer is selected from the group consisting of 1-vinyl-3-(3-sulfopropyl)-imidazolium hydroxide, 1-vinyl-3-(4-sulfobutyl)imidazolium hydroxide, 1-vinyl-2-methyl-3-(3-sulfopropyl)imidazolium hydroxide, 1-vinyl-2-methyl-3-(4-sulfobutyl)imidazolium hydroxide, 1-vinyl-3-(2-sulfobenzyl)imidazolium hydroxide, 2-vinyl-3-(3-sulfopropyl)imidazolium hydroxide, 2-vinyl-3-(4-sulfobutyl)imidazolium hydroxide, 4(5)-vinyl-1-(3-sulfopropyl sulfobutyl)imidazolium hydroxide, 4(5)-vinyl-1-(4-sulfobutyl)imidazolium hydroxide, 1-methyl-2-vinyl-3-(3-sulfopropyl)imidazolium hydroxide, 1-vinyl-3-(4-sulfobutyl)imidazolium hydroxide, and combinations thereof.

3. A process according to claim 1 wherein said ampholytic monomer is 1-vinyl-3-(3-sulfopropyl)imidazolium hydroxide.

4. A process according to claim 1 wherein said first crosslinking compound is selected from the group consisting of furfuryl alcohol, phenol, phenyl acetate, phenyl propionate, phenyl butyrate, p-hydroxybenzoic acid, methyl p-hydroxybenzoate, methyl o-hydroxybenzoate, phenyl salicylate, p-aminobenzoic acid, o-aminobenzoic acid, salicylic acid, salicylamide, salicyl alcohol, furfuryl alcohol, aspirin, ethyl p-hydroxybenzoate, o-hydroxybenzoic acid, hexyl p-hydroxybenzoate, and combinations thereof.

5. A process according to claim 4 wherein said first crosslinking compound is phenol.

6. A process according to claim 1 wherein said second crosslinking component is selected from the group consisting of formaldehyde, paraformaldehyde, acetaldehyde, propionaldehyde, decanal, glutaraldehyde, terephthaldehyde, hexamethylenetetramine, and mixtures thereof.

7. A process according to claim 6 wherein said crosslinking compound is formaldehyde.

8. A process according to claim 6 wherein said crosslinking compound is hexamethylenetetramine.

9. A process according to claim 1 wherein said comonomer is selected from the group consisting of acrylamide, methacrylamide, N,N-dimethylacrylamide, and combinations thereof.

10. A process according to claim 9 wherein said comonomer is acrylamide.

11. A process according to claim 1 wherein said repeating units derived from said ampholytic monomer are present in said composition in the range of from about 2 to about 98 mole percent.

12. A process according to claim 11 wherein said range is from about 3 to about 70 mole percent.

13. A process according to claim 12 wherein said range is from 5 to 50 mole percent.

14. A process according to claim 1 wherein said polymer is a copolymer of repeating units derived from 1-vinyl-3-(3-sulfopropyl)imidazolium hydroxide and acrylamide wherein said 1-vinyl-3-(3-sulfopropyl)imidazolium hydroxide is present in an amount within the range of 5 to 31 mole percent and said acrylamide is present in an amount within the range of 69 to 95 mole percent.

15. A process according to claim 1 further comprising one or more monomers selected from the group consisting of acrylonitrile, acrylic acid, methacrylic acid, alkali salts of acrylic acid, alkali salts of methacrylic acid, 2-methacryloyloxyethyltrimethylamine, 2-acrylamido-2-methylpropane sulfonic acid, alkali salts of 2-acrylamido-2-methylpropane sulfonic acid, 2-methacryloyloxyethane sulfonic acid, alkali salts of 2-methacryloyloxyethane sulfonic acid, N-vinyl-2-pyrrolidone, and combinations thereof.

16. A process according to claim 1 wherein said polymer is present in said composition in the range of from about 0.05 to about 10 weight percent based on total weight of said composition.

17. A process according to claim 16 wherein said range is from about 0.1 to about 7 weight percent.

18. A process according to claim 17 wherein said range is from about 0.2 to 5 weight percent.

19. A process according to claim 1 wherein said first crosslinking compound is present in said composition in the range of from about 0.005 to about 5 weight percent based on total weight of said composition.

20. A process according to claim 19 wherein said range is from about 0.01 to about 2 weight percent.

21. A process according to claim 20 wherein said range is from 0.03 to 1 weight percent.

22. A process according to claim 1 wherein said second crosslinking component is present in said composition in the range of from about 0.005 to about 5.0 weight percent.

23. A process according to claim 22 wherein said range is from about 0.01 to about 2 weight percent.

24. A process according to claim 23 wherein said range is from 0.03 to 1 weight percent.

25. A process according to claim 1 wherein said composition comprises a copolymer of repeating units derived from 1-vinyl-3-(3-sulfopropyl)imidazolium hydroxide and acrylamide, a first crosslinking compound, a second crosslinking component and water; wherein said 1-vinyl-3-(3-sulfopropyl)imidazolium hydroxide is present in an amount of 30 mole percent of said copolymer; said acrylamide is present in an amount of 70 mole percent of said copolymer; said copolymer is present in said composition in the range of from 0.2 to 5 weight percent; said first crosslinking compound is phenol which is present in said composition in the range of from 0.03 to 1.0 weight percent; said second crosslinking component is formaldehyde which is present in said composition in the range of from 0.03 to 1.0 weight percent; and said water makes up the rest of said composition.

26. A process according to claim 1 wherein said injecting is carried out in said subterranean formation having a temperature range of from about 150° F. to about 350° F.

27. A process according to claim 25 wherein said injection is carried out in said subterranean formation having a temperature range of 200° F. to 300° F.

* * * * *